Patented Dec. 16, 1947

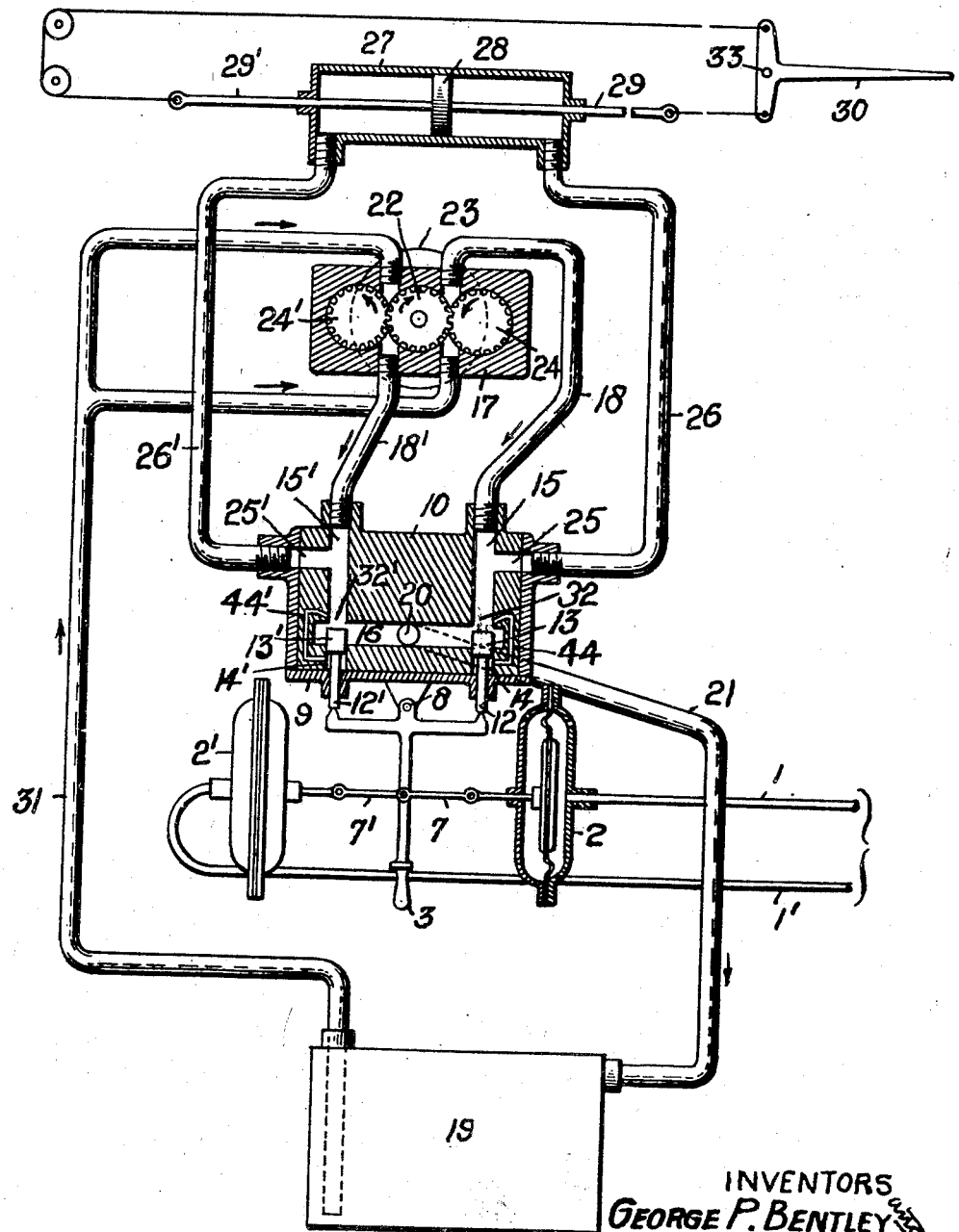

2,432,502

UNITED STATES PATENT OFFICE 2,432,502

HYDRAULIC CONTROL SYSTEM

George P. Bentley, Forest Hills, N. Y., and Carl A. Frische, Leonia, N. J., assignors to Sperry Gyroscope Company, Inc., Brooklyn, N. Y., a corporation of New York Application March 1, 1939, Serial No. 259,178

13 Claims. (Cl. 60—52)

1

This invention relates to hydraulic control systems and refers, more particularly, to systems in which a small control force is greatly amplified before being applied to the controlled object. One important application of a hydraulic system of this type is in the control of the flight of an airplane by means of an automatic pilot. In an automatic pilot, the sensitive elements which position the control surfaces of the airplane are small gyroscopes mounted in gimbal suspensions and the force which these gyroscopes are capable of exerting directly without experiencing a harmful reaction is extremely limited. It becomes necessary, therefore, to interpose between the controlling gyroscopes and the control surfaces of the airplane force amplifying systems which greatly increase the original control forces.

A common difficulty encountered when using high force or torque amplification is the tendency of the control system to hunt instead of coming to rest at a definite position. In the case of an automatic pilot in addition to the undesirability of the irregular flight of the plane due to this cause, the hunting may become dangerous if the frequency of the hunt coincides with the natural frequency of some part of the airplane structure thereby allowing large amplitude vibrations to build up.

Another disadvantage of existing control systems is that a high pressure must be supplied by the pump at all times and that they therefore absorb a relatively large percentage of full load power when no control is being exerted. This idling condition may exist during a considerable part of the total time a system is in use.

A still further disadvantage of existing hydraulic control systems is that the flow of oil or other operating fluid between the pump and the servo motor is controlled by effectively restricting the area of the conduit connecting these units. This results in a sluggish response of the servo motor to a change in the control force owing to the resistance offered by the decreased opening to the flow of fluid. This is particularly true when only a small control force is exerted. In addition because of the restricted valve openings which correspond to small control forces, the rate of response of the system is considerably affected by changes of viscosity of the operating fluid due to temperature changes.

One object of our invention is to provide a hydraulic control system which responds quickly to the application of a control force and whose speed of response is relatively independent of the viscosity of the operating fluid.

2

Another object is to provide a hydraulic system which is inherently stable and does not hunt.

A third object is to provide a control system which applies a smoothly graduated control force to the controlled object proportional to the signal input.

A still further object is to provide a hydraulic control system which operates at low pressure when the controlled object is not being moved and that therefore can be economically driven by low power means.

Other objects and advantages of this invention will become apparent as the description proceeds.

The accompanying drawing shows one form of our invention in its application to a hydraulic servo motor system for the control of a rudder surface and adapted for use in an automatic pilot.

The master control lever 3 for the valve 10 may be directly or indirectly controlled from any device capable of exerting a force thereon such as a gyroscope through a suitable force amplifying relay. For the sake of illustration the control of the force applied to lever 3 is shown as being exerted by a pair of oppositely acting pneumatic members 2 and 2' which are connected through tubes 1 and 1', respectively, with the differential air pick-off (not shown) on the gyroscope. Such a system is shown in the prior patent of Theodore W. Kenyon and Stephen J. Zand, No. 2,210,917, issued August 13, 1940, for Reactive servo system for automatic pilots, and need not be further described. The flexible pressure diaphragms of the two pneumatic members are connected through articulated rods 7 and 7' to the lever 3 and exert thereon a differential pressure signal or force generally proportional to the amount and/or rate of deviation from course or turn. It is obvious that the force applied to control lever 3 may be controlled in other ways than by the pneumatic means shown. For example, rods 7 and 7' may be disconnected and a force applied to lever 3 manually, electromagnetically, by a torque motor and so on. Lever 3 has its fulcrum at 8 on cover plate 9 attached to the body of balanced oil valve 10. The construction of this valve is symmetrical about the center line through fulcrum 8 so that any reference to an element located on one side of the center line implies the presence of a corresponding element on the opposite side. The two symmetrical arms of T-shaped lever 3 have knife edges bearing against the ends of piston rods 12 and 12'. These rods pass through bushings in cover plate 9 and carry valve piston 13 and 13' guided in cylinders 14 and 14' respectively. Piston 13 projects beyond its guide cylinder 14 partially closing the orifice 32 of longitudinal passage 15 where this passage communicates with transverse passage 16. Cylinder 14 and passage 15 are substantially coaxial. The fluid by means of which pressures are transmitted throughout the system is drawn from a reservoir or sump 19 through suction line 31 by one unit of a two-unit gear pump 17 and forced through supply line 18 into passage 15, through the orifice 32 into passage 16 and returns to sump 19 via port 20 and tail pipe 21. Piston 13' guided in cylinder 14' coaxial with passage 15' restricts orifice 32' by which passage 15' discharges into transverse passage 16. The second unit of pump 17, forces oil drawn from sump 19 through supply line 18' to passage 15' through its orifice 32' to passage 16 and thence to the sump through port 20 and tail pipe 21. A small by-pass 44 connects passage 15 and cylinder 14 and tends to equalize the pressure on the two sides of piston 13 and a similar by-pass 44' is provided around piston 13'. The area of by-passes 44 and 44' and the location of the openings by which they connect with passages 16 and 16' respectively, are of great importance in obtaining the desired action of the valve and will be discussed later. Pump 17 is of the gear type having a single gear 22, driven by a motor 23, meshing with two gears 24 and 24'. The combination of 22 and 24 forms one unit of the pump and the combination of 22 and 24' forms a second unit entirely distinct from the first. This dual or two-unit pump takes the place of two separate gear pumps each having two gears which would otherwise have to be employed. The pumping means shown normally supplies fluid to conduits 18 and 18' at equal rates.

Communicating with passage or mid tap 15 adjacent the connection of supply pipe 18 is transverse passage 25 leading to pressure line 26 which, in turn, communicates with servo cylinder 27 on the right-hand side of piston 28. A similar connection to the left-hand side of piston 28 from passage 15' is provided by passage or mid tap 25' and pressure line 26'. Piston rods 29 and 29' on opposite sides of piston 28 pass through bushings in the ends of cylinder 27 and connect with the rudder surface 30, pivoted on the tail structure of the plane at 33 in a manner which causes opposite translational motions of the piston to produce opposite rotations of the rudder surface.

When no control is being exerted by the system, either equal and opposite forces are applied through rods 7 and 7' to control lever 3, or depending on the nature of the primary control means, no force is applied to this lever. In either case the net moment of forces about point 8 is zero. Acting on lever 3 also are the forces due to fluid pressure on the two valve pistons 13 and 13' and applied to the lever through piston rods 12 and 12'. The magnitude of the fluid pressure depends on the degree to which the flow of liquid through orifices 32 and 32' is obstructed, the more complete the obstruction the higher the pressure that is built up. The adjustable orifices 32 and 32' may be looked upon as pressure relief or by-pass valves for controllably reducing the pressure which would otherwise be built up in passages 15 and 15'.

The two forces acting on the opposite arms of lever 3 are applied at the same distance from fulcrum 8 and tend to become equal since a greater force on one side produces an unbalanced moment tending to rotate lever 3 about fulcrum 8 and move the valve pistons in opposite directions restricting the orifice and increasing the fluid pressure on the side of the greater force and opening the orifice and decreasing the pressure on the side of the lesser force. In the absence of any control force the control lever assumes a balanced position and will return to that position if moved away from it. The balanced oil valve is therefore inherently stable.

By-pass 44 around valve piston 13 and by-pass 44' around 13' have been provided to balance the hydrostatic pressure acting on the pistons. These passageways cause the fluid pressure on the piston rod ends of the pistons to be equal to the pressure on the exposed ends under static conditions, that is, when the valve pistons are at rest. The pressure on the piston rod end of each piston gives rise to a force opposing the force due to the pressure on the exposed end but of lesser magnitude since the piston rod itself experiences no axial force due to fluid pressure. The net resultant force on each piston then becomes substantially equal to the product of the fluid pressure and the area of the piston rod. The cross sectional area of piston rods 12 and 12' is made small and the net forces acting on the pistons and transmitted to lever 3 are thereby greatly reduced.

The oil or other operating fluid flows continuously from sump 19 to pump 17 through the valve and back to the sump through tail pipe 21 as indicated by the flow arrows on the figure. Valve pistons 13 and 13' never completely shut off this flow but merely exert throttling control to build up pressure in passages 15 and 15'. Pressure pipe 26 being in direct communication with passage 15, any change of pressure in 15 is communicated to the fluid in 26 and thence to cylinder 27 producing an increased or decreased pressure on the right-hand side of piston 28. In a similar manner, a change of pressure in passage 15' is communicated to the left-hand side of piston 28. As an increased pressure in passage 15 is accompanied by a decreased pressure in passage 15' opposite pressure changes are produced simultaneously on the two faces of piston 28. If the unbalanced force due to these opposite pressure changes is sufficient to overcome the resistance of the load connected to piston 28, this piston will move in the direction in which the force acts, drawing an increased volume of oil into one side of the cylinder and expelling oil from the opposite side of the cylinder. It will be seen that the increased volume of oil taken by one side of the cylinder is supplied either through pipes 18 and 26 or through pipes 18' and 26' without passing any restricted area between the pump and the cylinder. No throttling occurs in this connecting passageway, the flow of fluid to the servo motor is not restricted and the response of this motor to a change of pressure is not retarded. Furthermore, a change of viscosity due to temperature change will not be reflected in a material change of rate of response of the control system.

The above description of our system has referred chiefly to its characteristics when at rest or in a balanced condition. Its operation under the influence of an applied control force will now be described. A condition is assumed in which at the start, a force acting toward the right is applied to lever 3. This force, which may be due to the air pressure in tube 1 being lower than that in tube 1', has a moment about point 8 which rotates lever 3 in a counter-clockwise direction causing valve piston 13 to move upward and still further restrict orifice 32 and causing piston 13' to move downward and further open orifice 32'.

The restriction of orifice 32 results in a higher pressure in passage 15 and the opening of orifice 32' results in a lower pressure in 15'. A greater force due to fluid pressure is thus exerted on piston 13 and transmitted by piston rod 12 to lever 3 and a lesser force is exerted on piston 13' and transmitted by piston rod 12' to lever 3. The resultant of these two forces has a moment tending to rotate lever 3 in a clockwise direction and this movement increases as the pistons move further in the directions stated until it balances the moment due to the control force.

The increased pressure in 15 and the reduced pressure 15' being communicated to opposite sides of piston 28, cause this piston to move toward the left and rotate the rudder 30 in a clockwise direction, and as the reaction of the rudder increases as it is rotated, a point will be reached at which this reaction balances the force exerted by the piston, which in turn is in a fixed ratio to the control force, and the entire system reaches a state of equilibrium.

The force exerted by piston 28 will be greater than the control force. The exact ratio of these two forces which is the force amplification of the system may be determined in the following manner.

Let

A be the area of piston 28
$p$ be the fluid pressure in passages 15 and 26
$p'$ be the fluid pressure in passages 15' and 26'
F be the net force acting on piston 28

Then
$$F = (p - p')A \qquad (1)$$

Let $a$ be the area of each of piston rods 12 and 12'
$c$ be the net force acting on piston 13 and transmitted by it to lever 3
$d$ be the net force acting on piston 13' and transmitted by it to lever 3

Then
$$c = pa$$
$$d = p'a$$

If each of these forces has a lever arm "$l$" about fulcrum 8 and if it is assumed for simplicity that the controlling force which will be represented by "$f$" has the same lever arm "$l$" about 8, the moment of the control force being equal to the sum of moments of the forces due to fluid pressure $$fl = pal - p'al$$
or
$$f = (p - p')a \qquad (2)$$

By comparing Equation 1 with Equation 2, it will be seen that the ratio of the force on piston 28 to the control force will be $$\frac{F}{f} = \frac{A}{a} \qquad (3)$$

Stated in words, the force amplification of the system which is the term on the left-hand side of (3) will be greater, the greater the ratio of the area of the servo piston to the area of the valve piston rod.

So far it has been assumed that by-passes 44 and 44' exactly equalize the pressure on the opposite ends of pistons 13 and 13'. This is not strictly true since the pressure over the exposed ends of the valve pistons is not uniform, being greater at the center than at the periphery. It is a principle of hydraulics, known as Bernoulli's principle, that in the flow of a fluid, an increased velocity head results in a decreased hydrostatic head or pressure. In the case of the valve pistons the velocity of flow is greatest at the periphery resulting in a lowered hydrostatic head in this region. As a consequence, the average pressure on the exposed head of piston 13, for example, is lower than the pressure in passage 15. If by-pass 44 were to transmit the pressure in 15 to the piston rod end of the piston the pressure acting against this end would be greater than that acting against the opposite end. The force on the piston rod end, which is equal to the product of this greater pressure times the area of the piston less the area of the stem, may thus be greater than the force acting on the face of the piston, which is equal to the above average pressure times the area of the exposed head or face of the piston 13. If this occurs, the piston will be drawn shut, producing an effect known as locking, which is a form of instability of the valve preventing proper control over at least part of the range of operation. To prevent this effect, applicants assure that the force at the piston rod end of the piston does not exceed the force on the exposed head or face. Thus, since a pressure gradient exists through orifice 32, the pressure transmitted by the by-pass to the piston rod end of piston 13 may be controlled by positioning the opening of the by-pass into the orifice and when the correct position has been chosen, a smooth operation of piston 13 is obtained regardless of the degree of closure of orifice 32. It will be apparent that the Bernoulli effect on the free end of piston 13' is similarly compensated for by-pass 44'. By the above described means, stable valve operation is attained regardless of the varying ratio of hydrostatic to velocity head occurring during the operation of the system. Irregular motion and locking of the valve due to the Bernoulli effect is inherent in many older forms of control systems.

By-passes 44 and 44' have another important function which is due to the fact that a flow of fluid must take place through these passages when the valve pistons are moved. By controlling the flow, the rate of motion of the pistons in response to the control force may be regulated. This control which is exerted by suitably proportioning the areas of the by-passes may be utilized to prevent overshooting of the valve pistons beyond their terminal positions which otherwise might cause hunting.

The above description of the operation of our system points out the manner in which a small control force applied to control lever 3 is amplified and applied to a movable controlled object. When the controlled object experiences an increasing reaction as it is moved from its central or normal position, the motion continues until an opposing force is built up which balances the amplified force exerted by the servo motor piston. The rudder of an airplane, used as an illustration in the figure, is acted on by an increasing force as it is rotated from its central position and therefore, a given force applied to control lever 3 will rotate the rudder through a definite angle corresponding to a definite force acting thereon due to air reaction. Another method of operation which may be used when increasing displacement of the controlled object does not produce increasing reaction, is to apply a control force until the desired displacement is produced and then release this force.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an automatic pilot for aircraft producing a differential pressure signal for controlling a hydraulic servo system for the control surface of the airplane, the combination including dual pumps for continuously and freely circulating fluid through two lines back to a sump, a double-acting servo motor, a side connection from each line to opposite sides of said motor, dual throttle valves in each line beyond said connections the exposed ends of which valves are subject to the pressure in its line, a balancing passage leading part of such pressure to the other end of said valves leaving only a small proportion of said pressure effective against the valve, and differential signal means for exerting oppositely varying forces on said valves, the resultant movement being opposed by said small proportion of the differential pressure in said lines.

2. A hydraulic servo system for automatic pilots of aircraft for positioning a rudder to exert a variable force thereon proportional to the signal force generated by the automatic pilot, comprising a reversible hydraulic motor, a dual source of hydraulic pressure, dual conduit means connecting said motor and source, a relief or by-pass valve in each conduit for controlling the pressure therein, said valve being subject to said pressure, a cross connection between said valves permitting only equal and opposite movement, means for balancing a predetermined portion of the hydrostatic pressure on said valves and for preventing hunting of said valves tending to produce fluctuation of said conduit pressures and consequent hunting of said motor, and primary means for oppositely moving said valves in response to a signal force produced by said automatic pilot until balanced by the unbalanced hydrostatic pressure on the valves, whereby the force exerted on the rudder is continuously proportional to the differential signal force produced by said automatic pilot.

3. A hydraulic control system for positioning a rudder as claimed in claim 2, wherein the means for balancing the predetermined portion of the hydrostatic pressure exerted in said bypass valves and for preventing hunting comprises a restricted passage leading behind each valve, whereby the rate of movement thereof in response to the control force is limited.

4. A hydraulic servo system for aircraft automatic pilots for exerting a variable force on a control surface proportional to the control force generated by the automatic pilot, comprising a double acting hydraulic motor having two conduits leading thereto, a fluid pump normally supplying said respective conduits with fluid at equal rates, a continuously open relief valve for each of said conduits for controlling the pressure therein having a piston with a face opposed to the pressure, a connection between said pistons permitting the same only equi-distant movement in opposite directions, means for balancing the effect of only a predetermined portion of the fluid pressure on each of the piston faces to delay the movement of each of said pistons and thereby prevent hunting of said valves and consequent fluctuation of said conduit pressures, and means responsive to the control force for moving said connection to operate the hydraulic motor, said motor operating until a balance is reached between the control force and a reactive force on said connection caused by the difference between the pressures on the respective piston faces.

5. A hydraulic servo system comprising a hydraulic motor having a pair of conduits thereto, pumping means effective to normally supply each of the conduits with fluid at equal rates, a relief valve in each of the conduits for controlling the pressure therein having a piston with a face opposed to the pressure, restrictive by-pass connections leading at least a portion of the pressure in each conduit behind the respective pistons to prevent hunting of said valves and consequent fluctuation of pressure in the conduits, a connection between said pistons permitting the same only equi-distant movement in opposite directions, and means responsive to a control force for operating said connection, said motor operating until a balance is reached between the control force and a reactive force on said connection caused by the difference between the pressures on the respective piston faces.

6. A hydraulic servo system as claimed in claim 5, including a sump having a connection to the fluid pumping means, and a common connection to the outlet end of each of said valves.

7. In a hydraulic servo system, a hydraulic motor having two conduits thereto, a pump for each of the conduits supplying fluids at normally equal rates, a continuously open relief valve in each of the conduits for controlling the pressure therein having a piston with a face opposed to the pressure, and a pivoted connection between said pistons permitting only equal and opposite movements thereof, said connection being automatically effective to balance the valves in the absence of a control force so that the pressures in the respective conduits are equal.

8. In a fluid control system for producing a differential pressure corresponding in sense and magnitude to the sense and magnitude of a force supplied to a control member, a casing having a pair of fluid inlets, two like positive displacement pumps respectively connected to said inlets, an exhaust connection to the intake of both pumps, a pair of normally partially open throttle valves situated between the respective inlets and said exhaust connection, a static pressure tap between each inlet and its throttle valve, said valves each including a piston having a stem at one end thereof, the free end of each of said pistons being exposed to the pressure in its respective inlet, a by-pass in said casing supplying a pressure intermediate the respective inlet and exhaust connection pressures to the stem end of each of said pistons to substantially counterbalance the effect on each piston of the greater portion of the pressure in its respective inlet, a cross-connection between said stems permitting only opposite and equal movements of said pistons, and means for displacing said cross connection from said control member whereby said pistons are moved thereby to differentially control the pressure of the fluid flowing past said respective taps, and a double acting servo motor connected to said taps whereby the relative pressure of the two sides thereof is varied as the pressure between each inlet and the respective throttle valve is varied.

9. In a fluid control system, a casing having a pair of fluid inlets, two like positive displacement pumps, one connected to each inlet, a common sump therefor connected to the intake of both pumps, means for controlling the flow of fluid through said casing from said inlets, comprising a pair of throttle valves, static pressure taps between each inlet and its throttle valve, each of said valves including a piston having a stem at one end thereof, the free end of each of said pistons being exposed to the pressure in its respective inlet, by-pass means in said casing by which a pressure is applied to the stem end of each of the pistons less than the pressure in its respective inlet to substantially counterbalance the greater portion of the pressure of the respective free end of said piston, a self-balancing connection between said stems permitting only opposite and equal movement of said pistons, and means for displacing said self-balancing connection, said pistons being oppositely moved by such displacement to control the pressure of the fluid flowing past said respective taps, and a double acting servo motor connected to said taps whereby the relative pressure of the two sides thereof is varied as the pressure between each inlet and the respective throttle valve is varied.

10. A valve as in claim 9 in which said by-pass means comprises a passageway for restricting the flow of fluid from one end of each piston to the other end, thereby effectively damping the movement of said pistons.

11. In a valve for producing a pressure head proportional in magnitude to the magnitude of a force exerted thereon by a control member, a casing, an inlet connection to said casing fed by a pump having an even discharge rate, a continuously open throttle valve in said casing for controlling the flow of fluid through said connection, said valve including a piston subject on one hand to the pressure in said connection and on the other hand to said control member, and means for damping the movements of said piston.

12. In apparatus providing two simultaneously effective supplies of motive liquid for a pressure-responsive device, first and second simultaneously-operating, positive-displacement gear pumps, a reservoir for liquid, passages for the supplies of liquid open to the outlets of the respective pumps, pump inlet passages communicating with the reservoir, bypass passages for conducting liquid from the respective supply passages to the reservoir and having valve seats facing in the direction of flow therethrough, a pair of valves movable toward and away from said seats to change the flows through the by-pass passages in order to change the supply passage pressures, mechanism for connecting said valves so that the force of liquid pressure applied to one valve is opposed by that applied to the other; said mechanism including a rocker, stems connected to the valves and abutting opposite ends of the rocker, and pivot means for the central portion of the rocker and reacting to oppose liquid pressure forces exerted thereon; a controlling member movable in opposite directions from a mid position; and means for applying oppositely-acting tilting forces to said connecting mechanism and responsive to departure of the controlling member from mid position in opposite directions to vary the tilting forces relatively to control the positions of the valves relative to their seats and consequently the relative liquid pressures in said supply passages so as to provide, with the controlling member in mid position, for a predetermined relation of pressures in the supply passages and to provide, with departure of the controlling member from mid position, for increase in one supply passage pressure and decrease in the other supply passage pressure according to the direction and extent of departure.

13. The combination as claimed in claim 12 wherein the pumps are of equal capacity and are comprised by two gears individual to the pumps and meshing with an intermediate gear common to the pumps.

GEORGE P. BENTLEY.
CARL A. FRISCHE.

REFERENCES CITED

The following references are of record in the file of this patent:

UNITED STATES PATENTS

| Number | Name | Date |
|---|---|---|
| 517,199 | Stannard | Mar. 27, 1894 |
| 566,982 | Hultgren | Sept. 1, 1896 |
| 833,583 | Crawford | Oct. 16, 1906 |
| 1,180,273 | Tarbox | Apr. 18, 1916 |
| 1,358,454 | McLeod | Nov. 9, 1920 |
| 1,454,396 | McDonald | May 8, 1923 |
| 1,592,081 | Colvin | July 13, 1926 |
| 1,623,121 | Kettering | Apr. 5, 1927 |
| 1,720,705 | Waterman | July 16, 1929 |
| 1,772,406 | Whiton | Aug. 5, 1930 |
| 1,890,041 | McLeod | Dec. 6, 1932 |
| 2,108,498 | McLeod | Feb. 15, 1938 |
| 2,173,210 | Lieb | Sept. 19, 1939 |
| 2,381,162 | Taylor | Aug. 7, 1945 |

FOREIGN PATENTS

| Number | Country | Date |
|---|---|---|
| 9,740 | Great Britain | Apr. 28, 1898 |
| 360,458 | Great Britain | Nov. 2, 1931 |
| 381,578 | Great Britain | Oct. 5, 1932 |
| 445,351 | Great Britain | Apr. 6, 1936 |
| 412,534 | Germany | Apr. 23, 1925 |
| 482,102 | Germany | Nov. 11, 1929 |

Certificate of Correction

Patent No. 2,432,502. December 16, 1947.

GEORGE P. BENTLEY ET AL.

It is hereby certified that error appears in the printed specification of the above numbered patent requiring correction as follows: Column 3, line 37, strike out the words "or mid tap" and insert the same after "passage" in line 39; and that the said Letters Patent should be read with this correction therein that the same may conform to the record of the case in the Patent Office.

Signed and sealed this 9th day of March, A. D. 1948.

[SEAL]

THOMAS F. MURPHY,
*Assistant Commissioner of Patents.*